(12) United States Patent
Bertagnolli

(10) Patent No.: US 7,841,428 B2
(45) Date of Patent: Nov. 30, 2010

(54) POLYCRYSTALLINE DIAMOND APPARATUSES AND METHODS OF MANUFACTURE

(75) Inventor: Kenneth E. Bertagnolli, Sandy, UT (US)

(73) Assignee: US Synthetic Corporation, Orem, UT (US)

( * ) Notice: Subject to any disclaimer, the term of this patent is extended or adjusted under 35 U.S.C. 154(b) by 494 days.

(21) Appl. No.: 11/351,564

(22) Filed: Feb. 10, 2006

(65) Prior Publication Data

US 2007/0187153 A1 Aug. 16, 2007

(51) Int. Cl.
*E21B 10/46* (2006.01)
(52) U.S. Cl. ........................................ 175/425; 175/434
(58) Field of Classification Search ................ 175/425, 175/374, 434, 426
See application file for complete search history.

(56) References Cited

U.S. PATENT DOCUMENTS

| | | | |
|---|---|---|---|
| 3,745,623 A | 7/1973 | Wentorf, Jr. et al. | |
| 4,104,441 A | 8/1978 | Fedoseev et al. | |
| 4,268,276 A | 5/1981 | Bovenkerk | |
| 4,274,900 A | 6/1981 | Mueller | |
| 4,410,054 A | 10/1983 | Nagel et al. | |
| 4,468,138 A | 8/1984 | Nagel | |
| 4,560,014 A | 12/1985 | Geczy | |
| 4,636,253 A | 1/1987 | Nakai et al. | |
| 4,738,322 A | 4/1988 | Hall | |
| 4,811,801 A | 3/1989 | Salesky | |
| 4,913,247 A | 4/1990 | Jones | |
| 5,016,718 A | 5/1991 | Tandberg | |
| 5,092,687 A | 3/1992 | Hall | |
| 5,120,327 A | 6/1992 | Dennis | |
| 5,128,080 A * | 7/1992 | Jurewicz et al. | 264/664 |
| 5,135,061 A | 8/1992 | Newton, Jr. | |

(Continued)

FOREIGN PATENT DOCUMENTS

EP 0715930 A1 12/1996

(Continued)

OTHER PUBLICATIONS

Davidenko, V.M., Kidalov, S.V., Shakhov, F.M., Yagovkina, M.A., Yashin, V.A., Vul', A. Ya, "Fullernes as a co-catalyst for high pressure—high temperature synthesis of diamonds," Diamond and Related Materials, 2004, 13: 2203-2206.

(Continued)

*Primary Examiner*—Daniel P Stephenson
(74) *Attorney, Agent, or Firm*—Holland & Hart, LLP

(57) ABSTRACT

Methods of manufacturing polycrystalline diamond are disclosed. More particularly, a mixture including diamond and fullerenes may be provided. Further, the mixture may be exposed to a high pressure, high temperature sintering process. In addition, a volume of polycrystalline diamond bonded to a substrate may be formed by providing a mixture including diamond and fullerenes and exposing the mixture to a high pressure, high temperature sintering process. A drill bit for drilling a subterranean formation is disclosed. Further, polycrystalline diamond compacts are disclosed including polycrystalline diamond bonded to a substrate, wherein the polycrystalline diamond includes less than about 1% by weight or is substantially free of non-fullerenes, non-diamond carbon. Polycrystalline diamond exhibiting an increased diamond volume fraction due to the presence of fullerenes during manufacture relative to polycrystalline diamond formed without fullerenes is disclosed.

35 Claims, 9 Drawing Sheets

U.S. PATENT DOCUMENTS

| | | |
|---|---|---|
| 5,154,245 A | 10/1992 | Waldenstrom |
| 5,209,916 A | 5/1993 | Gruen |
| 5,328,676 A | 7/1994 | Gruen |
| 5,364,192 A | 11/1994 | Damm et al. |
| 5,368,398 A | 11/1994 | Damm et al. |
| 5,370,855 A | 12/1994 | Gruen |
| 5,449,491 A | 9/1995 | Job |
| 5,460,233 A | 10/1995 | Meany |
| 5,462,776 A | 10/1995 | Gruen |
| 5,467,836 A | 11/1995 | Grimes et al. |
| 5,480,233 A | 1/1996 | Cunningham |
| 5,544,713 A | 8/1996 | Dennis |
| 5,620,512 A | 4/1997 | Gruen et al. |
| 5,759,216 A | 6/1998 | Kanada et al. |
| 5,900,225 A | 5/1999 | Mistry et al. |
| 5,954,147 A | 9/1999 | Overstreet et al. |
| 6,214,079 B1 * | 4/2001 | Kear et al. ................ 75/230 |
| 6,544,308 B2 | 4/2003 | Griffin et al. |
| 6,783,745 B1 | 8/2004 | Vomov et al. |
| 6,793,681 B1 | 9/2004 | Pope |
| 6,883,623 B2 | 4/2005 | McCormick et al. |
| 7,048,081 B2 | 5/2006 | Smith et al. |
| 7,060,641 B2 | 6/2006 | Qian et al. |
| 7,517,588 B2 | 4/2009 | Frushour |
| 7,635,035 B1 | 12/2009 | Bertagnolli et al. |
| 2004/0011433 A1 | 1/2004 | Shiozaki et al. |
| 2005/0019114 A1 | 1/2005 | Sung |
| 2005/0186104 A1 | 8/2005 | Kear et al. |
| 2006/0060390 A1 | 3/2006 | Eyre |
| 2006/0060392 A1 | 3/2006 | Eyre |
| 2006/0086540 A1 | 4/2006 | Griffin et al. |
| 2006/0147644 A1 | 7/2006 | Fujimura et al. |
| 2006/0266559 A1 | 11/2006 | Keshavan et al. |
| 2007/0056778 A1 | 3/2007 | Webb et al. |
| 2007/0144790 A1 | 6/2007 | Fang et al. |
| 2007/0272448 A1 | 11/2007 | Griffo |
| 2008/0085407 A1 | 4/2008 | Cooley et al. |
| 2010/0104874 A1 | 4/2010 | Yong et al. |

FOREIGN PATENT DOCUMENTS

| | | |
|---|---|---|
| FR | 2684090 | 5/1993 |
| RU | 2131763 | 6/1999 |
| WO | WO 99/10274 | 3/1999 |

OTHER PUBLICATIONS

Vul', A. Ya, Davidenko, V.M., Kidalov, S.V., Ordan'Yan, S.S., and Yashin, V.A., "Fullerenes Catalyze the Graphite-Diamond Phase Transition," Technical Physics Letters, 2001, vol. 27, pp. 384-386.

Kidalvo, S.V, Davidenko, V.M., Ordanyan, S.S., "Fullerenes as a Co-catalyst for HPHT Synthesis of Diamond," Frontier Carbon Technology Joint Conference, Aug. 6, 2001, NASA/CP—2001-2109948, pp. 237.238.

Kidalvo, S.V., Sokolov, V.I., Shakhov, F.M., Vul', A.Ya. "Mechanism of the Catalytic Effect of Fullerenes on the Graphite-Diamond Phase Transition at High Temperature and Pressure," Doklady Physical Chemistry, vol. 404, Part 1, 2005, pp. 179-181.

Vul', A. Ya et al., "Fullerenes Catalyze the Graphite-Diamond Phase Transition," Technical Physics Letters, vol. 27, No. 5 (2001), pp. 384-386.

PCT International Search Report dated Oct. 17, 2008; Written Opinion dated Oct. 17, 2008; PCT Transmittal of the International Search Report and Written Opinion; International Application No. PCT/US2007/016322 (12 pgs.).

Yushin, G.N. et al., "Effect of Sintering on Structure of Nanodiamond," Diamond and Related Materials, Aug. 10, 2005, vol. 14, pp. 1721-1729.

Minoru Akaishi et al., "Effect of Additive Graphite on Sintering of Diamond," Ceramic Bulletin, vol. 62, No. 6 (1983) pp. 689-694.

* cited by examiner

POLYCRYSTALLINE DIAMOND APPARATUSES AND METHODS OF MANUFACTURE

BACKGROUND

Apparatuses comprising polycrystalline diamond are utilized for a variety of applications and in a corresponding variety of mechanical systems. Generally, polycrystalline diamond elements are used in drilling tools (e.g., inserts, cutting elements, gage trimmers, etc.), machining equipment, bearing apparatuses, wire drawing machinery, and in other mechanical systems. More specifically, polycrystalline diamond compacts have found utility as cutting elements in drill bits (e.g., roller cone drill bits and fixed cutter drill bits).

A polycrystalline diamond compact ("PDC") typically includes a diamond layer or table formed by a sintering process employing high temperature and high pressure conditions that causes the diamond table to become bonded to a substrate (such as cemented tungsten carbide substrate), as described in greater detail below. Optionally, the substrate may be brazed or otherwise joined to an attachment member such as a stud or to a cylindrical backing, if desired. A PDC may be employed as a subterranean cutting element mounted to a drill bit either by press-fitting, brazing, or otherwise locking the stud into a receptacle defined by the drill bit, or by brazing the cutting element directly into a preformed pocket, socket, or other receptacle formed in the subterranean drill bit. In one example, cutter pockets may be formed in the face of a matrix-type bit comprising tungsten carbide particles that are infiltrated or cast with a binder (e.g., a copper-based binder), as known in the art. Such subterranean drill bits are typically used for rock drilling and for other operations which require high abrasion resistance or wear resistance. Generally, a rotary drill bit may include a plurality of polycrystalline abrasive cutting elements affixed to the drill bit body.

A PDC is normally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure conditions. The ultra-high pressure and ultra-high temperature conditions cause the diamond crystals or grains to bond to one another to form polycrystalline diamond. In addition, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are among examples of solvent catalysts for forming polycrystalline diamond. In one configuration, during sintering, solvent catalyst comprising the substrate body (e.g., cobalt from a cobalt-cemented tungsten carbide substrate) becomes liquid and sweeps from the region adjacent to the diamond powder and into the diamond grains. Of course, a solvent catalyst may be mixed with the diamond powder prior to sintering, if desired. Also, as known in the art, such a solvent catalyst may dissolve carbon. Such carbon may be dissolved from the diamond grains or portions of the diamond grains that graphitize due to the high temperatures of sintering. The solubility of the stable diamond phase in the solvent catalyst is lower than that of the metastable graphite under high-pressure, high temperature ("HPHT") conditions. As a result of this solubility difference, the undersaturated graphite tends to dissolve into solution; and the supersaturated diamond tends to deposit onto existing nuclei to form diamond-to-diamond bonds. Thus, diamond grains become mutually bonded to form a polycrystalline diamond table upon the substrate. The solvent catalyst may remain in the polycrystalline diamond layer within the interstitial pores between the diamond grains or the solvent catalyst may be at least partially removed from the polycrystalline diamond, as known in the art. For instance, the solvent catalyst may be at least partially removed from the polycrystalline diamond by acid leaching. A conventional processes for forming polycrystalline diamond cutters is disclosed in U.S. Pat. No. 3,745,623 to Wentorf, Jr. et al., the disclosure of which is incorporated herein, in its entirety, by this reference. Optionally, another material may replace the solvent catalyst that has been at least partially removed from the polycrystalline diamond.

One of ordinary skill in the art may appreciate that providing polycrystalline diamond, polycrystalline diamond compacts apparatuses, structures, or other articles of manufacture including polycrystalline diamond with improved properties and methods of manufacture may be advantageous.

SUMMARY

One aspect of the instant disclosure relates to a method of manufacturing polycrystalline diamond. More particularly, a mixture may be provided, the mixture comprising: at least about 80% by weight diamond and fullerenes. Further, the mixture may be exposed to a pressure of at least about 60 kilobar and the mixture may be heated to a temperature of at least about 1350° Celsius. In another embodiment, the mixture may be exposed to a pressure of at least about 52 kilobar and the mixture may be heated to a temperature of at least about 1320° Celsius. In a further embodiment, the mixture may be exposed to a pressure of at least about 48 kilobar and the mixture may be heated to a temperature of at least about 1160° Celsius. For example, such a process may be used in combination with a non-cobalt catalyst, such as INVAR®.

Another aspect of the present invention relates to an article of manufacture. Specifically, an article of manufacture may comprise a volume of polycrystalline diamond bonded to a substrate (e.g., a compact, a cutting element, a wire die, a heat sink, a wear element, etc.). In addition, the volume of polycrystalline diamond may be formed by providing a mixture comprising at least about 80% by weight diamond and fullerenes, exposing the mixture to a pressure of at least about 60 kilobar, and heating the mixture to a temperature of at least about 1350° Celsius. In another embodiment, the mixture may be exposed to a pressure of at least about 52 kilobar and the mixture may be heated to a temperature of at least about 1320° Celsius. In a further embodiment, the mixture may be exposed to a pressure of at least about 48 kilobar and the mixture may be heated to a temperature of at least about 1160° Celsius. For example, such a process may be used in combination with a non-cobalt catalyst, such as INVAR®.

A further aspect of the present invention relates to a drill bit for drilling a subterranean formation. Such a drill bit may include a bit body comprising a leading end having generally radially extending blades structured to facilitate drilling of a subterranean formation. Further, the drill bit may include at least one cutting element comprising a substrate including a volume of polycrystalline diamond bonded to the substrate on an end surface of the substrate. Additionally, the volume of polycrystalline diamond may be formed by providing a mixture comprising at least 80% by weight diamond and fullerenes, exposing the mixture to a pressure of at least about 60 kilobar, and exposing the mixture to a temperature exceeding 1350° Celsius. In another embodiment, the mixture may be exposed to a pressure of at least about 52 kilobar and the mixture may be heated to a temperature of at least about 1320° Celsius. In a further embodiment, the mixture may be exposed to a pressure of at least about 48 kilobar and the mixture may be heated to a temperature of at least about 1160° Celsius. For example, such a process may be used in combination with a non-cobalt catalyst, such as INVAR®.

In addition, one aspect of the present invention relates to a polycrystalline diamond compact comprising a volume of polycrystalline diamond bonded to a substrate; wherein the polycrystalline diamond includes less than about 1% by weight carbon in a non-fullerenes, non-diamond form. A further aspect of the present invention relates to a polycrystalline diamond compact comprising a volume of polycrystalline diamond bonded to a substrate wherein the polycrystalline diamond is substantially free of non-fullerenes, non-diamond carbon.

A further aspect of the present invention relates to polycrystalline diamond exhibiting a relatively high diamond volume fraction. In one embodiment, such polycrystalline diamond may form a polycrystalline diamond compact. The present invention contemplates that such polycrystalline diamond may exhibit an increased diamond volume fraction due to the presence of fullerenes during manufacture relative to polycrystalline diamond formed without fullerenes. In one embodiment, a polycrystalline diamond compact may comprise a volume of polycrystalline diamond bonded to a substrate, wherein the volume of polycrystalline diamond exhibits a diamond volume fraction exceeding about 90% due to the presence of fullerenes during manufacture of the volume of polycrystalline diamond.

Features from any of the above-mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein.

DETAILED DESCRIPTION

Figure 1:
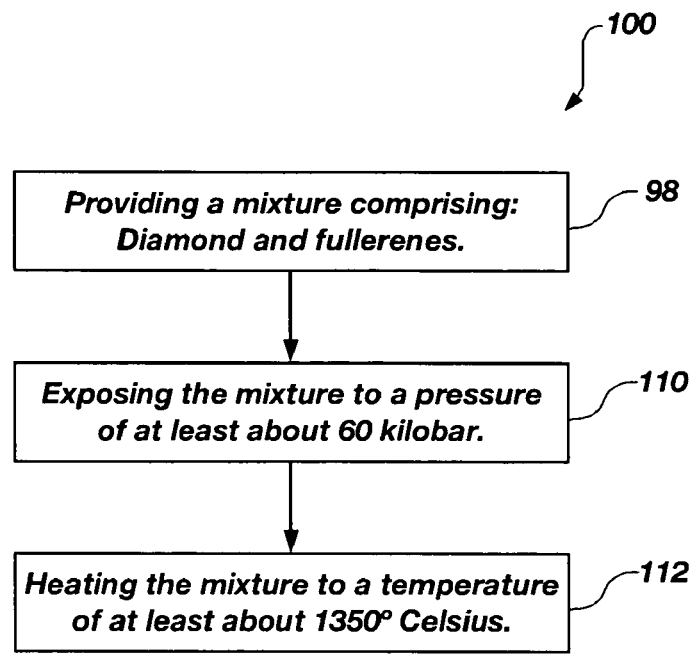
FIG. 1 shows a schematic diagram of one embodiment of a method for forming polycrystalline diamond according to the present invention.

The present invention relates generally to structures comprising polycrystalline diamond and methods of manufacturing such structures. As described above, during sintering, small diamond particles or grains (i.e., diamond powder) are caused to bond together to form a larger, substantially coherent structure.

As described above, manufacturing polycrystalline diamond involves the compression of diamond particles under extremely high pressure. Such compression may occur at room temperature, at least initially, and may result in the reduction of void space in the diamond powder (e.g., due to brittle crushing, sliding, and/or stacking of diamond particles). Of course, diamond particles are very hard and may not pulverize easily. Thus, the diamond particles may sustain very high local pressures where they come in contact with each other, but the pressures experienced on noncontacting surfaces of the diamond particles and in the interstitial voids may be relatively low. Manufacturing polycrystalline diamond further involves heating the diamond powder during compression of the diamond powder. Such heating may increase the temperature of the diamond powder from room temperature at least to the melting point of a solvent catalyst. At elevated temperature, regions of the diamond powder that are not under high local pressure may graphitize. As a solvent-catalyst melts, it may infiltrate or "sweep" through the diamond particles. In addition, as known in the art, a solvent catalyst (e.g., cobalt, nickel, iron, etc.) may dissolve and transport carbon between the diamond grains and facilitate diamond formation. Particularly, the presence of a solvent catalyst may facilitate formation of diamond-to-diamond bonds comprising polycrystalline diamond and resulting in a coherent skeleton of diamond.

The present invention generally contemplates that a mixture may comprise diamond and fullerenes and may be exposed to a high-pressure, high-temperature (HPHT) sintering process to form polycrystalline diamond. Such a method may enhance graphite-to-diamond conversion, diamond formation, or bonding of the diamond particles during HPHT sintering of diamond powder. The term "fullerenes," as used herein, refers to any polygonal form of carbon. One common form of fullerenes comprises 60 carbon atoms arranged in a geodesic dome structure. Such a carbon structure is termed a "Buckminsterfullerene" or "fullerene," although such structures are also sometimes referred to as "buckyballs." Fullerenes are commonly denoted as $C_n$ fullerenes (e.g., n=24, 28, 32, 36, 50, 60, 70, 76, 84, 90, or 94) with "n" corresponding to the number of carbon atoms in the "complete" fullerenes structure. Further, elongated fullerenes structures can contain millions of carbon atoms, forming a hollow tube-like structure just a few atoms in circumference. These fullerenes structures are commonly known as carbon "nanotubes" or "buckytubes" and may have single or multiwalled structures. Any portion of such dome structures or tubes (i.e., any polygonal form of carbon) is encompassed by the term "fullerenes."

Thus, generally, the present invention contemplates that a mixture may be provided comprising diamond and fullerenes. Further, such a mixture may be exposed to a pressure of at least about 60 kilobar and may be heated to a temperature of at least about 1350° Celsius (i.e., HPHT sintered). For example, such a process may be used with a catalyst such as cobalt. Such a method 100 is schematically shown in FIG. 1 and includes process actions labeled 98, 110, and 112. Process actions 110 and 112 may be referred to collectively as a HPHT sintering process. In another embodiment, the mixture may be exposed to a pressure of at least about 52 kilobar and the mixture may be heated to a temperature of at least about 1320° Celsius. In a further embodiment, the mixture may be exposed to a pressure of at least about 48 kilobar and the mixture may be heated to a temperature of at least about 1160° Celsius. For example, such a process may be used in combination with a non-cobalt catalyst, such as INVAR®. Any of the above-mentioned examples of pressures and temperatures for sintering processes may be employed within any of the below-discussed embodiments and aspects of the present invention, without limitation.

Figure 2:
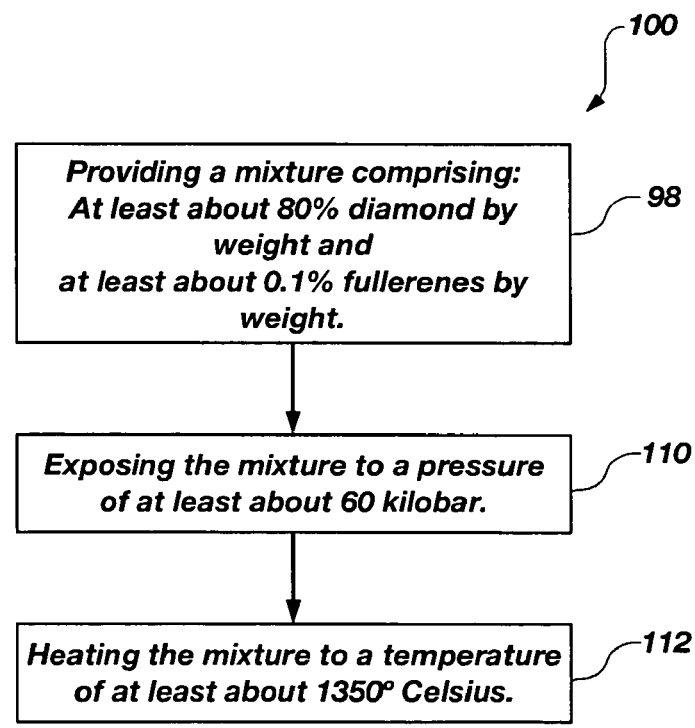
FIG. 2 shows a schematic diagram of another embodiment of a method for forming polycrystalline diamond according to the present invention.

In addition, many variations in the weight percentage of diamond as well as the weight percentage of fullerenes may be employed in a process for forming polycrystalline diamond. For example, as shown in the method 100 illustrated in FIG. 2, generally, a mixture may be provided, the mixture comprising at least about 80% by weight diamond and at least about 0.01% by weight fullerenes. Such mixture may be exposed to a pressure of at least about 60 kilobar and may be heated to a temperature of at least about 1350° Celsius. Optionally, such a HPHT sintering process may include heating the mixture to a temperature exceeding 1400° Celsius. In one embodiment, the mixture may comprise a diamond powder having a nominal size of between about 10 microns and 100 microns. In another embodiment, the mixture may comprise a diamond powder having a nominal size of about 2 μm to about 20 μm. Further, in an additional embodiment, the mixture may comprise a diamond powder having a nominal size of less than 1 μm (i.e., submicron sized diamond powder). Any combination of the foregoing size ranges or other diamond powder formulations as known in the art are encompassed by the present invention, without limitation. Diamond powder of various size and properties, which may be known as synthetic grit or diamond grit/powder, may be commercially available from, for example, Diamond Innovations of Worthington, Ohio, among other commercial manufacturers.

In another embodiment, an overall fullerenes concentration may be between about 0.01% by weight and about 0.30% by weight. For example, as shown in the method 100 illustrated in FIG. 3, a mixture comprising at least about 80% by weight diamond and between about 0.01% and about 0.3% by weight fullerenes may be exposed to a pressure of at least about 60 kilobar and may be heated to a temperature of at least about 1350° Celsius. In another example, a mixture comprising at least about 80% by weight diamond and about 0.1% by weight fullerenes may be exposed to a pressure of at least about 60 kilobar and may be heated to a temperature of at least about 1350° Celsius (i.e., process actions 110 and 112).

As may be appreciated by one of ordinary skill in the art, it may be beneficial for fullerenes to be relatively pure. Such purity may limit contaminants, non-fullerenes carbon content of the mixture, or both. For example, fullerenes may be at least 99% pure (e.g., 99.5% pure). As a further aspect of the present invention, limiting a non-fullerenes, non-diamond carbon content of the mixture to be HPHT sintered (i.e., process actions 110 and 112) may be beneficial. For example, a non-fullerenes, non-diamond carbon content of the mixture may be less than about 0.003% by weight of the mixture (i.e., less than 1% of a 0.3% by weight fullerenes concentration). In another example, a non-fullerenes, non-diamond carbon content of the mixture may be less than about 0.0001% by weight of the mixture (i.e., less than 1% of 0.01% by weight fullerenes concentration).

Figure 4:
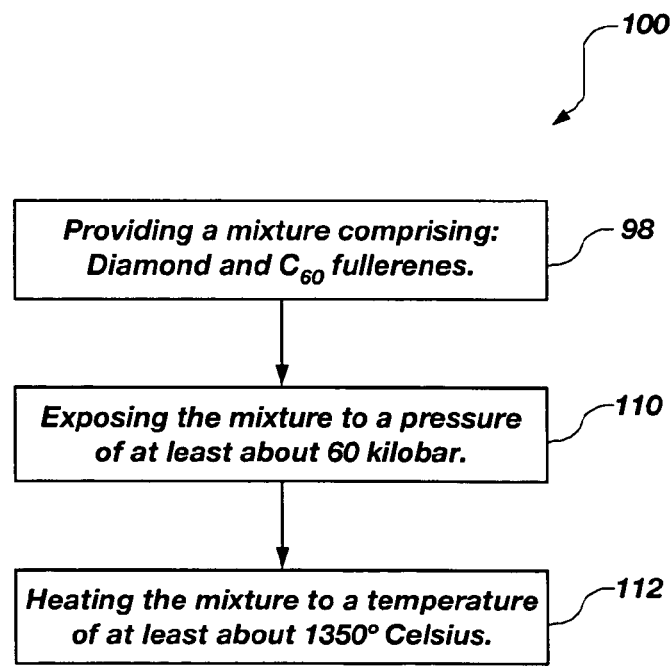
FIG. 4 shows a schematic diagram of an additional embodiment of a method for forming polycrystalline diamond according to the present invention.

In a further embodiment, the present invention contemplates that a mixture comprising $C_{60}$ fullerenes and diamond may be exposed to a HPHT sintering process. FIG. 4 illustrates such a method 100. Optionally, the $C_{60}$ fullerenes may comprise between about 0.01% and about 0.30% by weight of the mixture. Optionally, the $C_{60}$ fullerenes concentration of the mixture may be between about 0.01% and about 0.30% by weight. In another example, the mixture may comprise about 0.1% by weight $C_{60}$ fullerenes.

Any mixture of one or more $C_n$ fullerenes (e.g.,. n=24, 28, 32, 36, 50, 60, 70, 76, 84, 90, and 94) may comprise a mixture that is HPHT sintered (i.e., process actions 110 and 112) to form polycrystalline diamond. For example, in another embodiment, as shown in the method 100 illustrated in FIG. 5, $C_{60}$ fullerenes, $C_{70}$ fullerenes, and diamond may comprise a mixture that is HPHT sintered. Optionally, the overall fullerenes concentration may be between about 0.01% and about 0.30% by weight. In a further example, the mixture may comprise about 0.1% by weight $C_{60}$ fullerenes and $C_{70}$ fullerenes.

Figure 6:
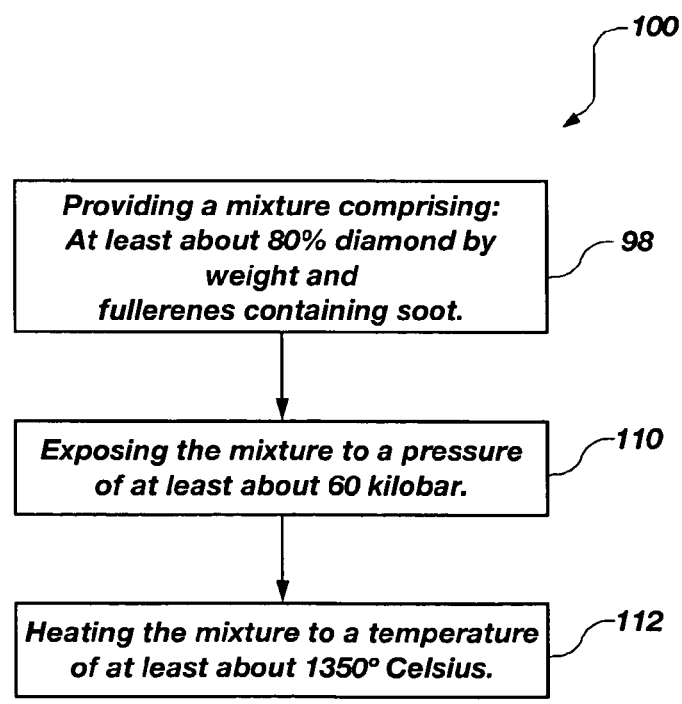
FIG. 6 shows a schematic diagram of yet an additional embodiment of a method for forming polycrystalline diamond according to the present invention.

In a further embodiment, a mixture may be provided comprising fullerenes containing soot and diamond. FIG. 6 shows a method 100 wherein a mixture comprising fullerenes containing soot and diamond may be exposed to a HPHT sintering process (i.e., process actions 110 and 112) including exposure of the mixture to a pressure of at least about 60 kilobar and heating of the mixture to at least 1350° Celsius. Optionally, the net fullerenes concentration of the mixture may be between about 0.01% and about 0.30% by weight of the mixture.

Figure 7:
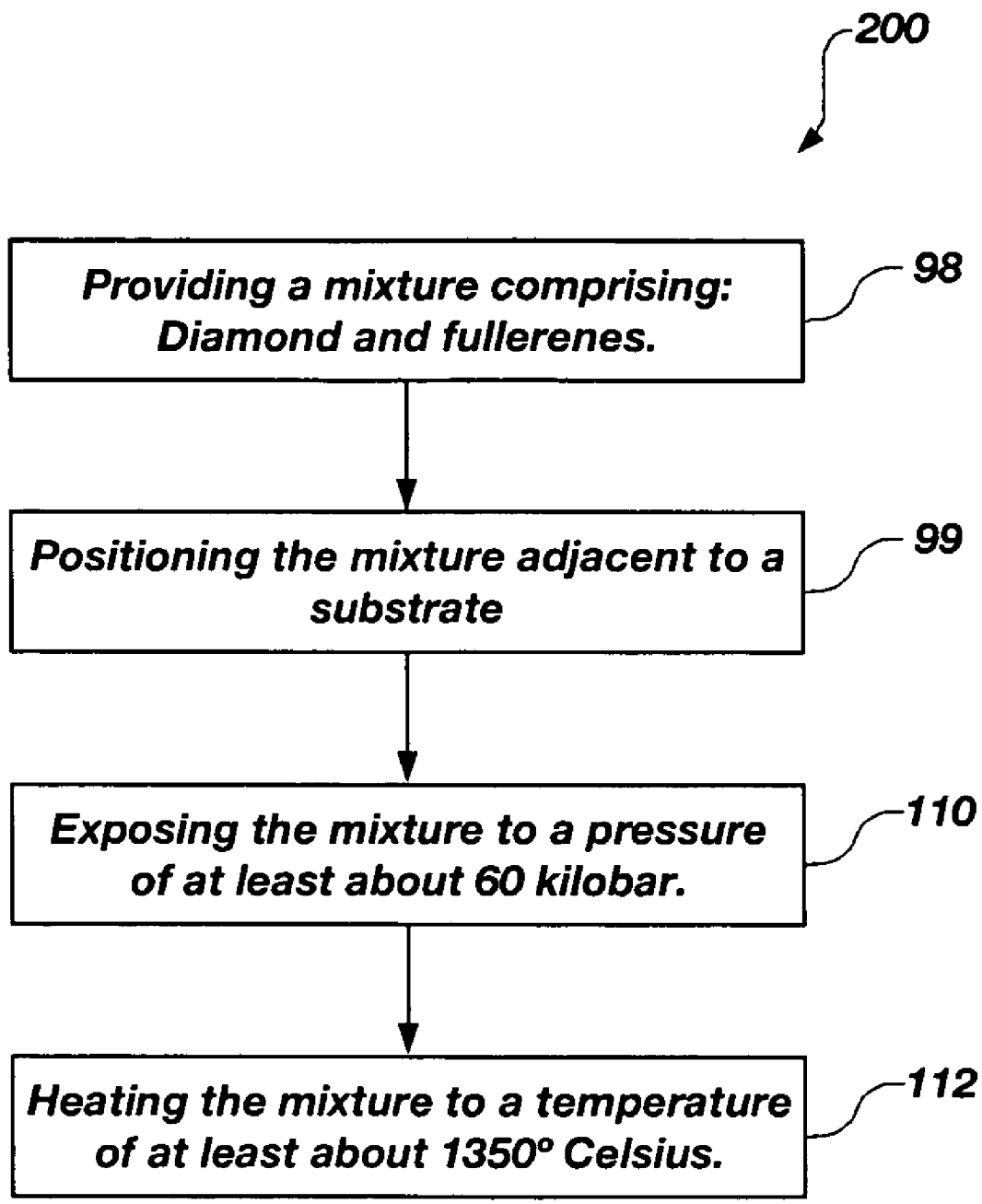
FIG. 7 shows a schematic diagram of yet a further embodiment of a method for forming polycrystalline diamond according to the present invention.

It should be understood that polycrystalline diamond is utilized in many applications. For instance, wire dies, bearings, artificial joints, inserts, cutting elements, and heat sinks may include polycrystalline diamond. Thus, the present invention contemplates that any of the methods encompassed by the above-discussion related to forming polycrystalline diamond may be employed for forming an article of manufacture comprising polycrystalline diamond. Generally, the present invention contemplates that a volume of polycrystalline diamond may be formed upon a substrate. FIG. 7 shows a schematic representation of a method 200 for manufacturing an article of manufacture comprising polycrystalline diamond. Typically, a mixture comprising diamond and fullerenes may be positioned (as shown in the process action labeled 99) adjacent to a substrate (e.g., a substrate comprising cobalt-cemented tungsten carbide) and subjected to a HPHT sintering process (process actions labeled 110 and 112). Such a sintering process may produce a volume of polycrystalline diamond formed upon the substrate. Any substrate known in the art may be utilized, such as a substrate comprising at least one of the following: titanium carbide, niobium carbide, tantalum carbide, vanadium carbide, iron, and nickel, without limitation.

In one example of an article of manufacture comprising polycrystalline diamond, the present invention contemplates that any process encompassed by the above discussion may be employed for forming polycrystalline diamond compacts. Generally, polycrystalline diamond compacts are manufactured by positioning a mixture comprising diamond adjacent to a substrate (e.g., a cobalt-cemented tungsten carbide substrate) and subjecting the mixture and substrate to a HPHT sintering process. Thus, a polycrystalline diamond layer or table (i.e., a volume of polycrystalline diamond) may be formed upon the substrate. As known in the art, a polycrystalline diamond compact may be used as a cutting element or a bearing element, as discussed in further detail below.

Figure 8:
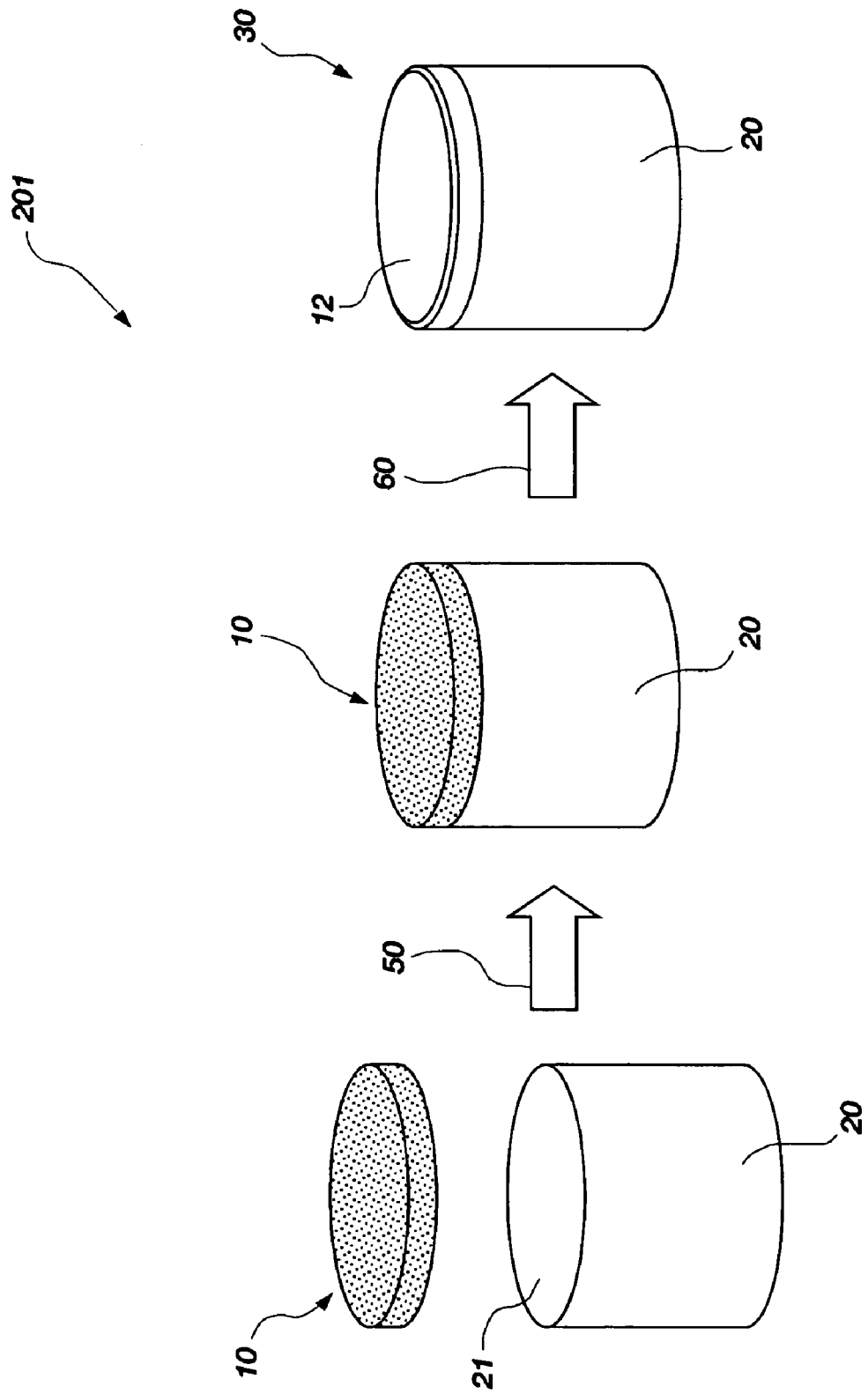
FIG. 8 shows a schematic diagram of one embodiment of a method for forming an article of manufacture comprising polycrystalline diamond according to the present invention.

Thus, the present invention contemplates that a mixture may be provided comprising diamond and fullerenes for forming a polycrystalline diamond cutting element. Such a mixture may be positioned adjacent to a substrate, such as, for instance, a cobalt-cemented tungsten carbide substrate. In other embodiments, a substrate may comprise at least one of the following: titanium carbide, niobium carbide, tantalum carbide, vanadium carbide, iron, and nickel, without limitation. Further, the mixture and the substrate may be exposed to a pressure of at least about 60 kilobar and may be heated to a temperature of at least about 1350° Celsius (i.e., HPHT sintered). Such a method 201 is schematically shown in FIG. 8. Particularly, mixture 10 and substrate 20 may be provided. As shown in FIG. 8, substrate 20 may be substantially cylindrical and may include an interfacial substrate surface 21. Optionally, substrate 20 may comprise cobalt-cemented tungsten carbide. Although FIG. 8 shows interfacial substrate surface 21 as being substantially planar, as known in the art, interfacial substrate surface 21 may exhibit a selected nonplanar topography, without limitation. In addition, assembly of the mixture 10 and substrate 20, which is represented by an arrow labeled 50 in FIG. 8, may position the mixture 10 adjacent to the substrate 20. As shown in FIG. 8, mixture 10 may be positioned upon interfacial substrate surface 21. Of course, other structural elements (e.g., metal cans, graphite structures, pyrophyllite or other pressure transmitting structures, or other containers or supporting elements as known in the art) may be employed for positioning mixture 10 and substrate 20 or for successfully sintering mixture 10 to form polycrystalline diamond. Thus, mixture 10 and substrate 20 may be exposed to a sintering process, which is represented by an arrow labeled 60 in FIG. 8, to cause mixture 10 to form a polycrystalline diamond table 12, as shown in FIG. 8. Thus, a polycrystalline diamond compact 30 may be formed by such a process.

Thus, the present invention contemplates that any apparatus as known in the art comprising polycrystalline diamond may include polycrystalline diamond formed (i.e., sintered) with fullerenes as described above. In one example, a rotor and a stator (i.e., a thrust bearing apparatus) may each comprise polycrystalline diamond and may be operably assembled to downhole drilling assembly, as known in the art. U.S. Pat. Nos. 4,410,054, 4,560,014, 5,364,192, 5,368,398, and 5,480,233, the disclosure of each of which is incorporated herein, in its entirety, by this reference, disclose exemplary subterranean drilling systems within which bearing apparatuses according to the present invention may be incorporated. Of course, polycrystalline diamond sintered with fullerenes may comprise heat sinks, wire dies, bearing elements, cutting elements, cutting inserts (e.g., on a roller cone type drill bit), machining inserts, or any other article of manufacture as known in the art. Other examples of articles of manufacture comprising polycrystalline diamond may be disclosed by, inter alia, U.S. Pat. Nos. 4,811,801, 4,274,900, 4,268,276, 4,468,138, 4,738,322, 4,913,247, 5,016,718, 5,092,687, 5,120,327, 5,135,061, 5,154,245, 5,460,233, 5,544,713, and 6,793,681, the disclosure of each of which is incorporated herein, in its entirety, by this reference.

As known in the art, during sintering, a catalyst material (e.g., cobalt, nickel, etc.) may be employed for facilitating formation of polycrystalline diamond. More particularly, as known in the art, diamond powder or material placed adjacent to a cobalt-cemented tungsten carbide substrate and subjected to a HPHT sintering process may wick or sweep molten cobalt into the diamond. Such cobalt may remain in the polycrystalline diamond table upon sintering and cooling. In other embodiments, catalyst may be provided within the diamond material, as a layer of material between the substrate and diamond, or as otherwise known in the art. As also known in the art, such a catalyst material may be at least partially removed (e.g., by acid-leaching or as otherwise known in the art) from at least a portion of the volume of polycrystalline diamond (e.g., a table) formed upon the substrate. Catalyst removal may be substantially complete to a selected depth from an exterior surface of the polycrystalline diamond table, if desired, without limitation. As known in the art, such catalyst removal may provide a polycrystalline diamond material with increased thermal stability, which may also beneficially affect the wear resistance of the polycrystalline diamond material.

Figure 3:
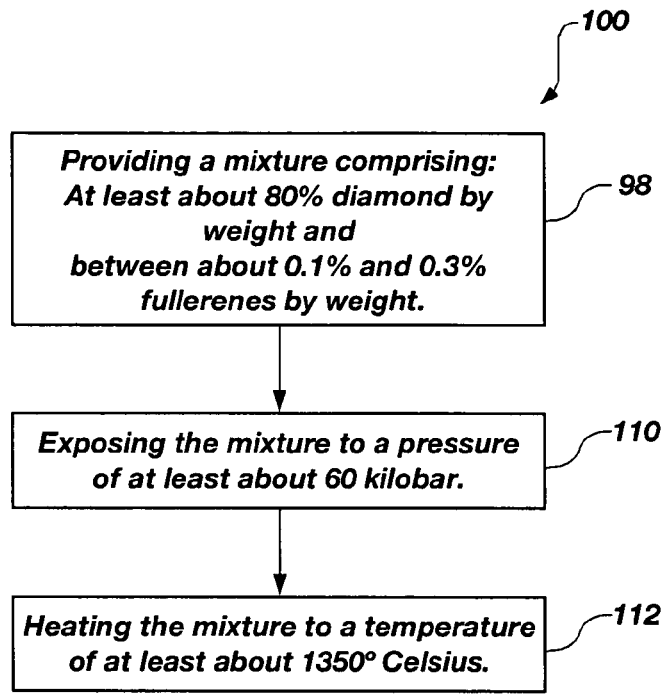
FIG. 3 shows a schematic diagram of a further embodiment of a method for forming polycrystalline diamond according to the present invention.
Figure 5:
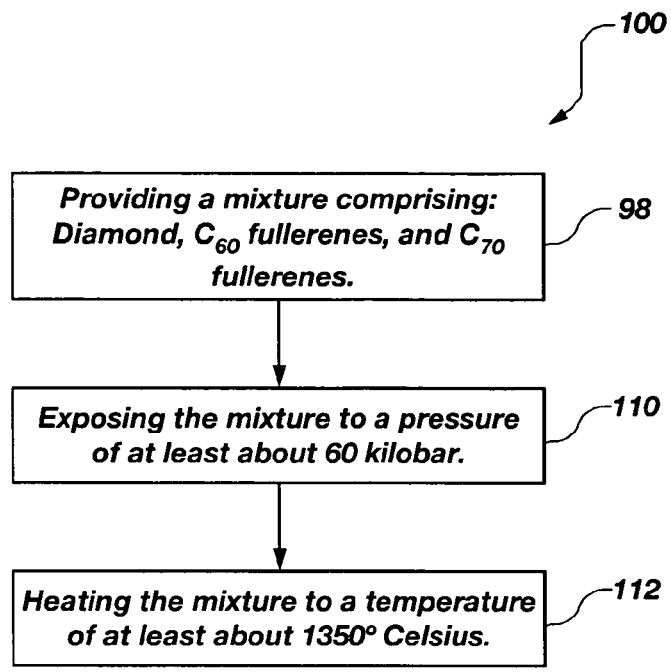
FIG. 5 shows a schematic diagram of yet another embodiment of a method for forming polycrystalline diamond according to the present invention.

The present invention contemplates that mixture 10 as shown in FIG. 8 (or as described in FIG. 7) may comprise any of the mixtures described above in relation to FIGS. 1-6. Thus, as described above, many variations in the weight percentage of diamond as well as the weight percentage of fullerenes are encompassed by the present invention for forming polycrystalline diamond cutting elements. For example, mixture 10, as shown in FIG. 8, may comprise the mixture shown in FIG. 2. Specifically, mixture 10 may comprise a mixture comprising at least about 80% by weight diamond and at least about 0.01% fullerenes. Optionally, the overall fullerenes concentration (i.e., weight percentage) may be between about 0.01% and about 0.30% by weight. In another example, mixture 10 may comprise a mixture as shown in FIG. 3. Specifically, mixture 10 may comprise a mixture comprising at least about 80% by weight diamond and about 0.01% to about 0.3% fullerenes. In a further embodiment, the present invention contemplates that mixture 10 may comprise a mixture, as shown in FIG. 4, which comprises $C_{60}$ fullerenes and diamond. Optionally, $C_{60}$ fullerenes may comprise between about 0.01% and about 0.30% by weight of the mixture 10. The present invention contemplates that any mixture of one or more $C_n$ fullerenes (e.g., n=24, 28, 32, 36, 50, 60, 70, 76, 84, 90, and 94) may comprise mixture 10 and may be HPHT sintered to form a polycrystalline diamond compact 30 as shown in FIG. 8, without limitation. Further, in another embodiment, mixture 10 may comprise a mixture, as shown in FIG. 5, which comprises $C_{60}$ fullerenes, $C_{70}$ fullerenes, and diamond. Optionally, the overall fullerenes concentration may be between about 0.01% and about 0.30% by weight. In a further embodiment, mixture 10 may comprise a mixture comprising fullerenes containing soot and diamond. Optionally, the net fullerenes concentration provided by such fullerenes containing soot may be between about 0.01% and about 0.30% by weight of the mixture, as shown in FIG. 6.

Further, the inventors of the present invention have discovered that increases in wear resistance of polycrystalline diamond cutting elements may result from including fullerenes with diamond to form polycrystalline diamond cutting elements or compacts. Particularly, laboratory tests indicate that polycrystalline diamond cutting elements manufactured with fullerenes exhibit increased wear resistance and thermal stability in comparison to conventionally manufactured polycrystalline diamond cutting elements. More specifically, diamond having a nominal size of about 20 microns was mixed with various concentrations of 99.5% pure $C_{60}$ fullerenes to produce three cutting elements. Such $C_{60}$ fullerenes material may be commercially available from, for example, MER Corporation, of Tucson, Ariz. Generally, the diamond and $C_{60}$ fullerenes mixture was placed adjacent to a cemented tungsten carbide substrate and loaded into a niobium vessel. One polycrystalline diamond cutting element was manufactured without any fullerenes. The niobium vessel was subjected to a pressure of at least about 60 kbar and a temperature of about 1400° C. for about 5 minutes. All four of the polycrystalline diamond cutting element cutters referenced in Table 1 were sintered in the same HPHT process. The polycrystalline diamond cutting elements manufactured according to this sintering process were subsequently used to machine Sierra White granite both with and without added coolant. The results of these experimental tests are summarized in Table 1, shown below.

TABLE 1

| Fullerenes Weight % | Distance cut (without coolant) (ft.) | Wearflat volume (with coolant) (in$^3$) |
| --- | --- | --- |
| 0.0 | 1258 | $1.49 \times 10^{-4}$ |
| 0.1 | 1708 | $1.12 \times 10^{-4}$ |
| 0.2 | 1334 | $1.31 \times 10^{-4}$ |
| 0.5 | 1148 | $1.22 \times 10^{-4}$ |

Additional laboratory tests for three polycrystalline diamond cutting elements cutters that were manufactured during another HPHT cycle were performed. More specifically, results of this experimental test are summarized in Table 2, shown below.

TABLE 2

| Fullerenes Weight % | Distance cut (without coolant) (ft.) | Wearflat volume (with coolant) (in$^3$) |
| --- | --- | --- |
| 0.05 | 1182 | $2.01 \times 10^{-4}$ |
| 0.10 | 1353 | $1.70 \times 10^{-4}$ |
| 0.20 | 1105 | $1.88 \times 10^{-4}$ |

The above data may indicate relative wear resistance and thermal stability as a function of fullerenes weight percentage for the cutting elements included within each experimental group. More particularly, the overall distances cut without coolant (prior to failure of the cutting element) associated with cutting elements that were manufactured with various concentrations of $C_{60}$ fullerenes are shown in the second columns of Tables 1 and 2. Also, the third columns of Tables 1 and 2 show wearflat volumes generated by cutting a given amount (about 400 in$^3$) of Sierra White granite with cutting elements that were manufactured with various concentrations of $C_{60}$ fullerenes.

Figure 9:
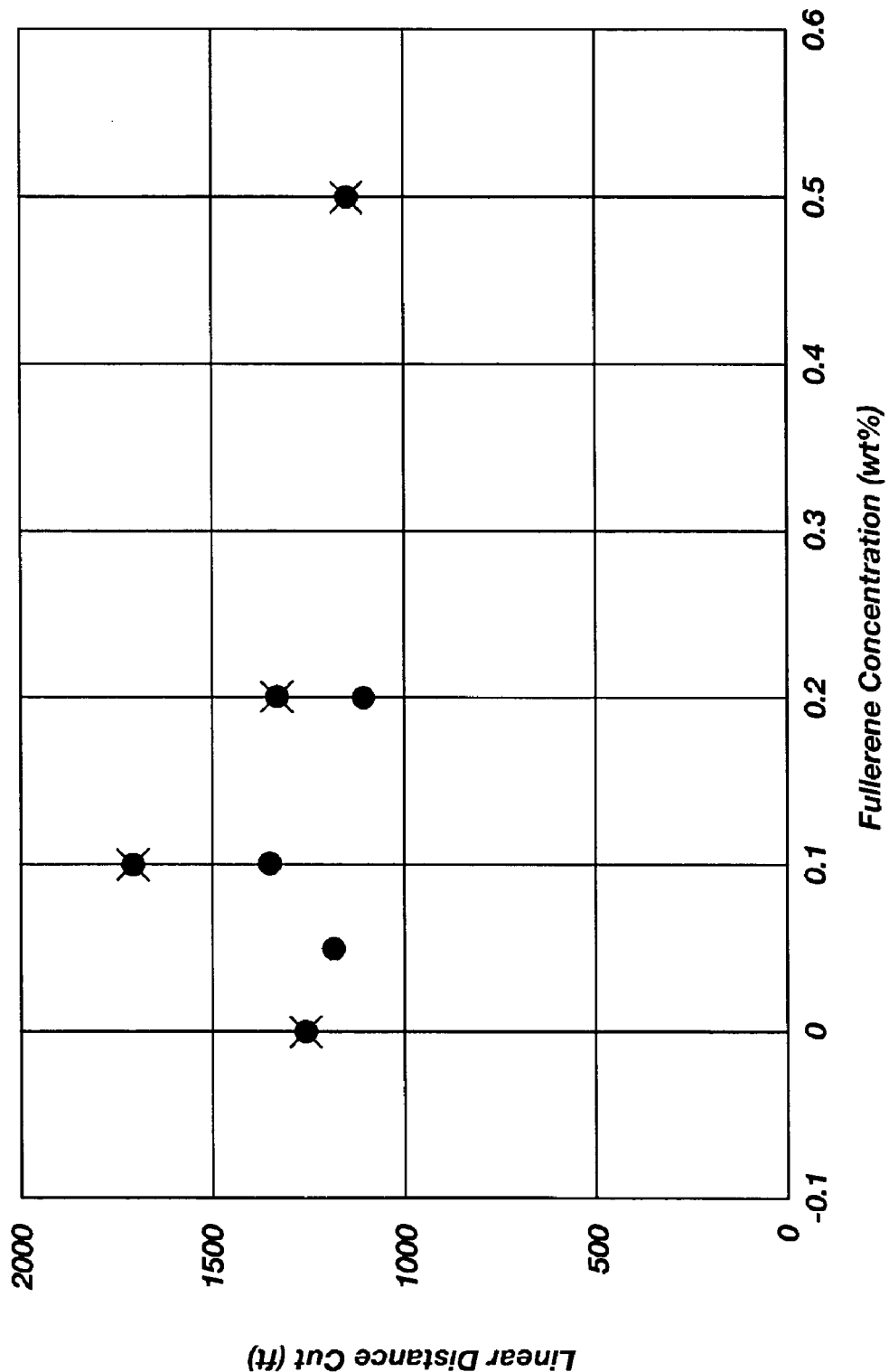
FIG. 9 shows a graph depicting experimental linear distance data as a function of fullerenes concentration.
Figure 10:
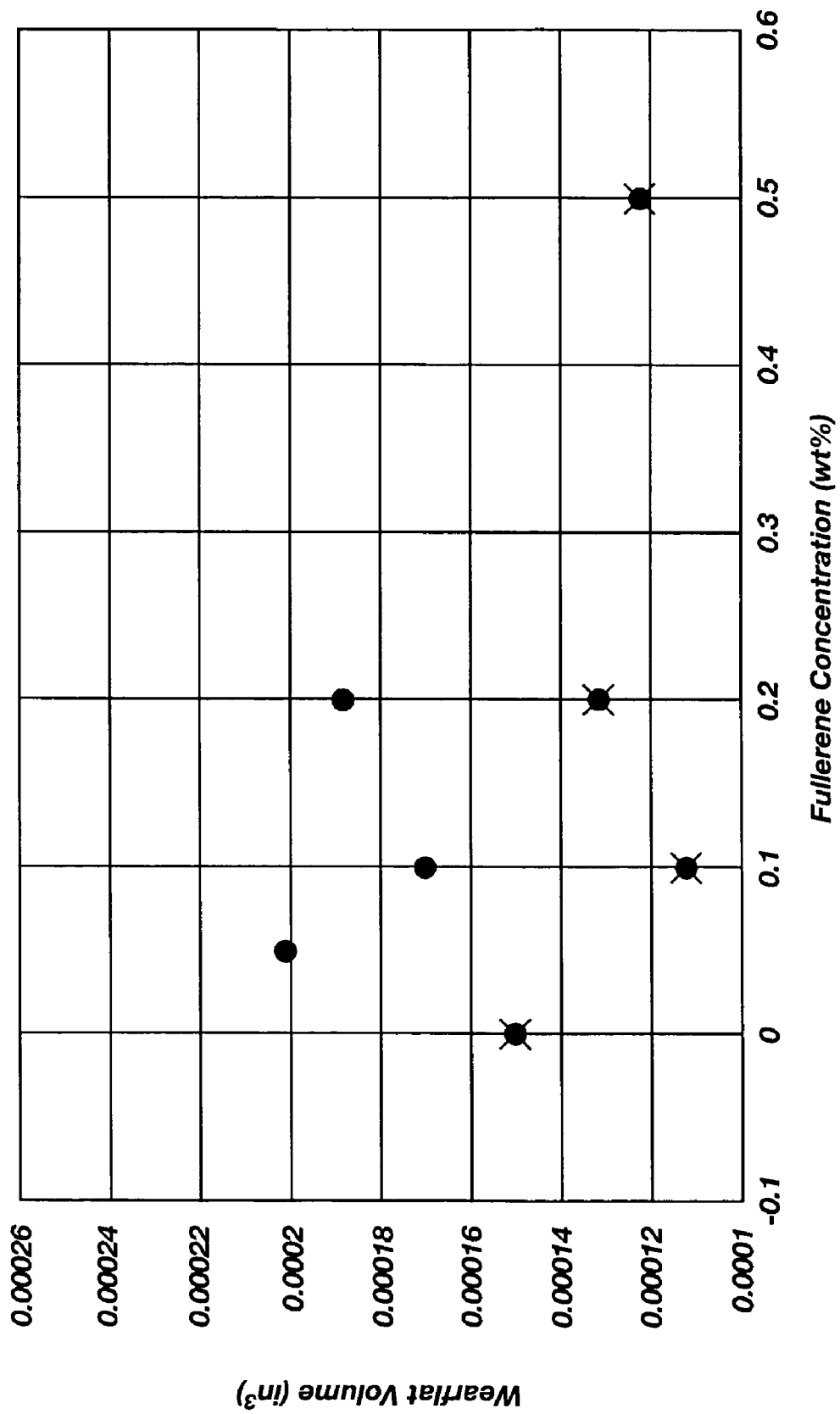
FIG. 10 shows a graph depicting experimental wearflat volume data as a function of fullerenes concentration.

Further, FIGS. 9 and 10 show graphs that depict the data contained in Tables 1 and 2. As may be appreciated, the data associated with polycrystalline diamond cutting elements from Table 1 should not be directly compared to the data associated with polycrystalline diamond cutting elements from Table 2, because the cutting elements were produced in separate HPHT processes and tested on different rocks. Explaining further, although separate HPHT processes may be controlled and performed in substantially identical manners (e.g., same control parameters, process times, temperatures, pressures, etc.), variations in the processes may occur. In addition, rock properties vary based on the location in the quarry, rock orientation, inhomogeneity of composition, etc. Such variations in properties may lead to variation in test results. Thus, the differences between the data in Table 1 and Table 2 would need to be normalized before direct comparison of any cutting element of Table 1 with any cutting element of Table 2 would be appropriate. However, commonalities or trends shared between Tables 1 and 2 may indicate characteristics relating to wear resistance and thermal stability as a function of fullerenes concentration of a diamond mixture prior to sintering (HPHT).

Generally, a distance cut by a cutting element without coolant may indicate a thermal stability of the cutting elements. In addition, a wearflat volumes (i.e., amount of diamond worn from the diamond table during cutting) generated with coolant (for a given or selected volume of material cut) may relate to a wear resistance of a cutting element. Explaining further, a relatively longer distance cut without coolant may indicate a relatively high thermal stability. In addition, a relatively small wearflat volume may indicate a relatively high wear resistance. As shown in FIGS. 9 and 10, incorporation of 0.1% fullerenes by weight resulted in the highest measured wear resistance and highest indicated thermal stability of the cutting elements that are summarized in Table 1. Similarly, incorporation of 0.1% fullerenes by weight resulted in the highest measured wear resistance and highest indicated thermal stability of the cutting elements that are summarized in Table 2.

As noted above, polycrystalline diamond cutting compacts that are formed by the processes discussed above may exhibit wear resistance and thermal stability that exceed conventionally manufactured polycrystalline diamond cutting elements. Thus, the experimental results discussed above may indicate that polycrystalline diamond that is formed according to the processes of present invention is structurally different from polycrystalline diamond that is formed conventionally. For example, employing fullerenes in a sintering process comprising pressure of at least about 60 kilobar and temperature of at least about 1350° Celsius may result in increased diamond-to-diamond bonding or overall diamond formation in comparison to polycrystalline diamond formed by conventional processes.

Further, polycrystalline diamond formed by the methods described above may exhibit structural differences in comparison to conventionally manufactured polycrystalline diamond. For example, one of ordinary skill in the art may appreciate that, subsequent to HPHT sintering, at least some fullerenes may remain within the polycrystalline diamond. Thus, the nature of any remaining fullerenes within the polycrystalline diamond may be structurally distinguishable and detectable in comparison to nondiamond carbon, if any, that may be present within a conventionally formed polycrystalline diamond.

As a further structural characteristic, polycrystalline diamond formed by the above-described methods may include a relatively small amount of non-fullerenes (and non-diamond) carbon. In one example, a non-fullerenes, non-diamond carbon content of polycrystalline diamond formed by any of the above-referenced methods (or variants thereof) may be less than about 1% by weight of the polycrystalline diamond. In another example, a non-fullerenes, non-diamond carbon content of polycrystalline diamond formed by any of the above-referenced methods (or variants thereof) may be less than about 0.003% by weight of the polycrystalline diamond. In another example, a non-fullerenes, non-diamond carbon content of the polycrystalline diamond may be less than about 0.0001% by weight of the polycrystalline diamond. In a further embodiment, polycrystalline diamond may be substantially free of a non-fullerenes, non-diamond carbon. Of course, other unique structural aspects of polycrystalline diamond formed with fullerenes may be detectable and may indicate the temperature and pressure of the HPHT sintering process employed to form the polycrystalline diamond.

As a further structural aspect of polycrystalline diamond formed by any of the methods described above, such polycrystalline diamond may exhibit a relatively high diamond volume fraction (i.e., a diamond density). More specifically, results of experimentally-determined diamond volume fractions relating to polycrystalline diamond formed with varying fullerenes concentrations are summarized in Table 3, shown below.

TABLE 3

| Fullerenes Weight % | Diamond Volume Fraction | Standard Deviation |
|---|---|---|
| 0.0 | 89.33% | 0.11% |
| 0.05 | 90.65% | 0.19% |
| 0.10 | 90.72% | 0.02% |
| 0.15 | 90.65% | 0.16% |
| 0.20 | 90.54% | 0.08% |
| 0.50 | 90.11% | 0.32% |

In general, as shown in Table 3, polycrystalline diamond formed without fullerenes may exhibit a diamond volume fraction of about 89.33%. Relative to the data shown in Table 3, a diamond powder having a nominal size of about 20 µm was employed for forming the polycrystalline diamond. As shown in Table 3, each fullerenes weight percentage correlates with a diamond volume fraction exceeding about 90%. In one embodiment, the present invention contemplates that polycrystalline diamond formed with fullerenes or including fullerenes may exhibit a diamond volume fraction that exceeds 90%. In addition, the present invention contemplates that, in a different embodiment, polycrystalline diamond formed with fullerenes may exhibit a diamond volume fraction that exceeds about 90.5%. In another embodiment, the present invention contemplates that polycrystalline diamond formed with fullerenes may exhibit a diamond volume fraction that exceeds about 90.6%. In a further embodiment, the present invention contemplates that polycrystalline diamond formed with fullerenes may exhibit a diamond volume fraction that is about 90.7% or exceeds about 90.7%. Of course, a polycrystalline diamond compact (i.e., a polycrystalline diamond volume bonded to a substrate) may comprise polycrystalline diamond exhibiting a relatively high diamond volume fraction. One of ordinary skill in the art will appreciate that diamond volume fraction may be influenced by, among other considerations, pressures and temperatures of a HPHT sintering process, catalyst composition, and initial diamond powder grain size. Accordingly, in general, the present invention contemplates that a volume of polycrystalline diamond may exhibit an increased diamond volume fraction due to the presence of fullerenes during manufacture relative to polycrystalline diamond formed without fullerenes. Thus, given substantially identical (within controllable parameters) HPHT processes and material compositions, polycrystalline diamond formed in the presence of fullerenes may exhibit a higher diamond volume fraction relative to polycrystalline diamond formed without fullerenes.

Figure 11:
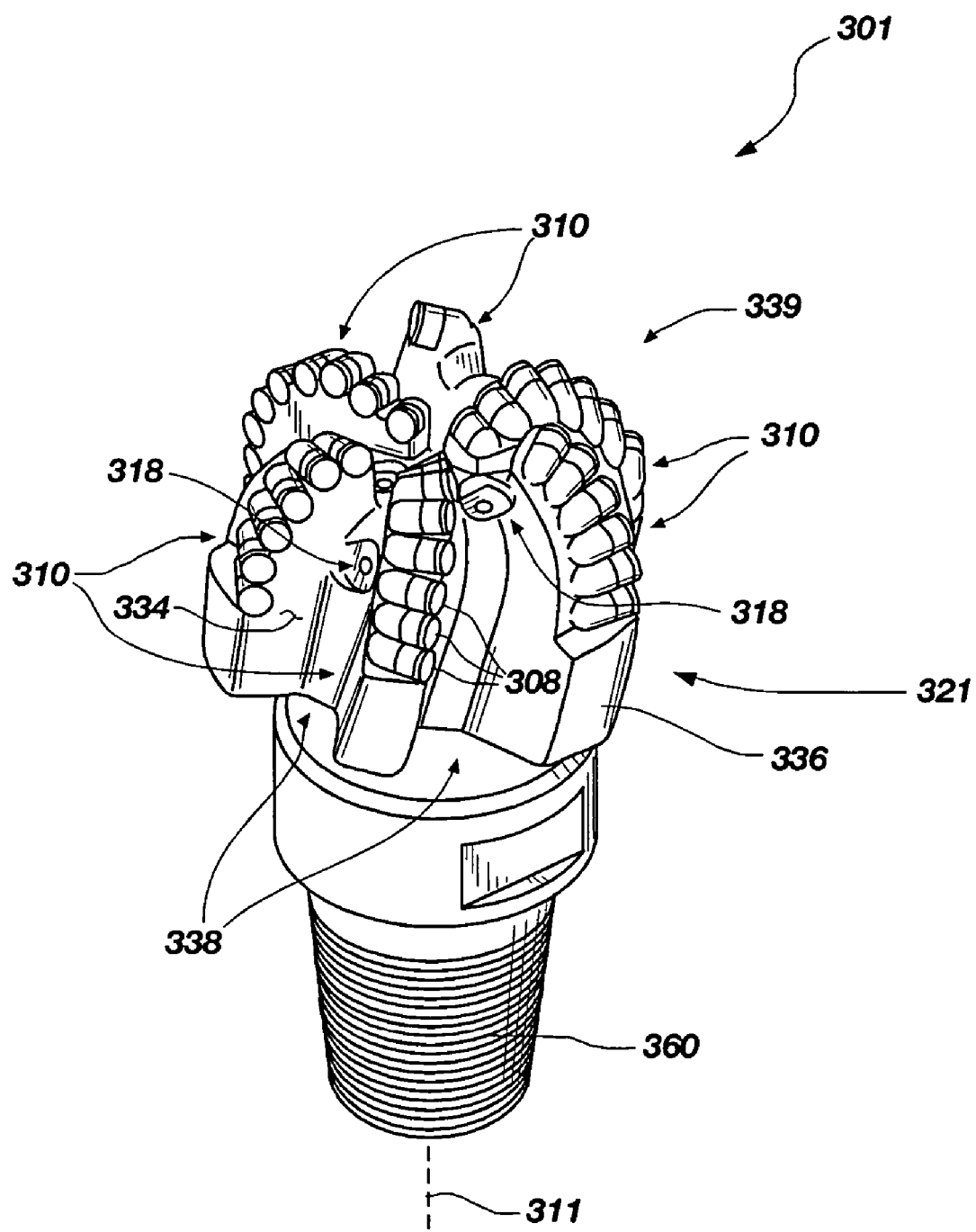
FIG. 11 shows a perspective view of a rotary drill bit including at least one cutting element according to the present invention.
Figure 12:
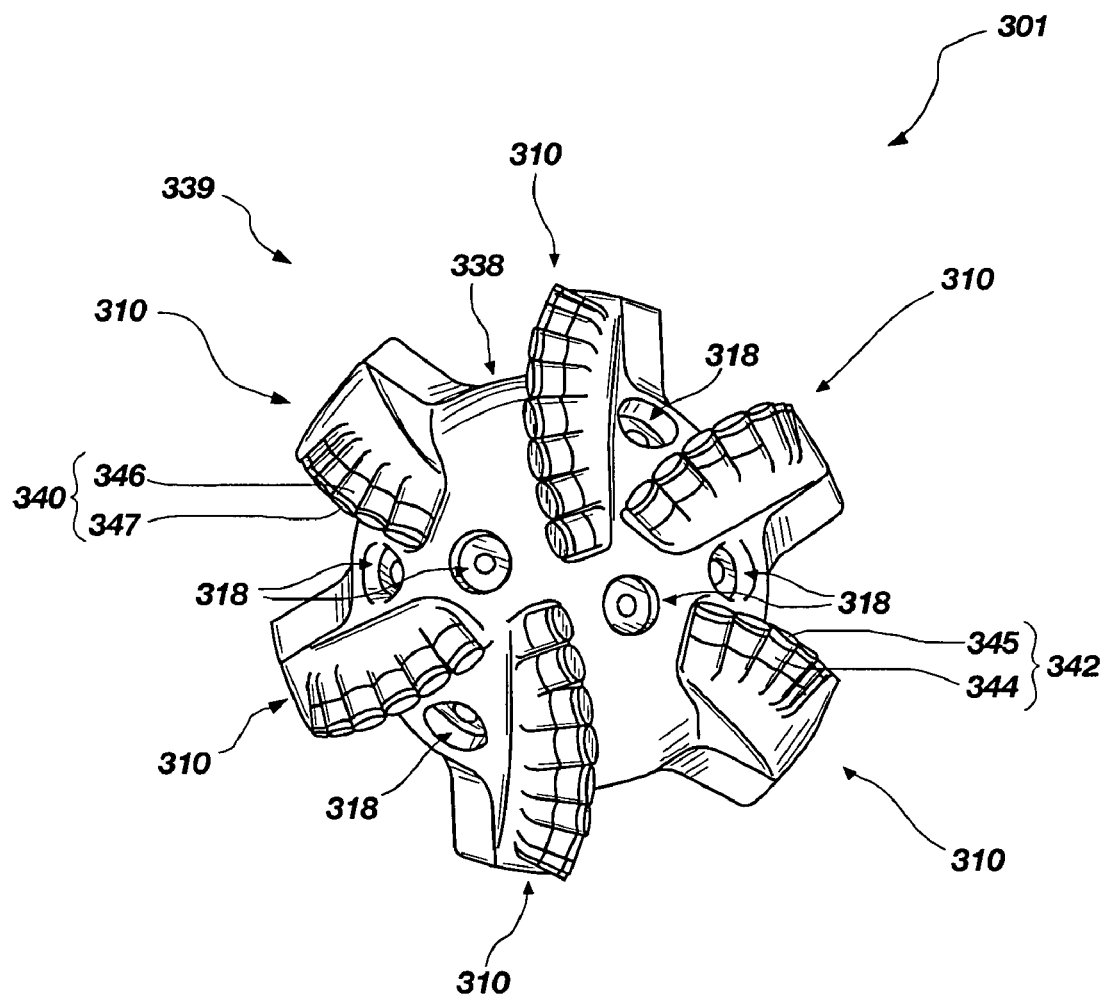
FIG. 12 shows a top elevation view of the rotary drill bit shown in FIG. 11.

As may be appreciated from the foregoing discussion, the present invention further contemplates that at least one cutting element manufactured according to the above-described processes may be coupled to a rotary drill bit. Such a configuration may provide a cutting element with enhanced wear resistance in comparison to a conventionally formed cutting element. For example, FIGS. 11 and 12 show a perspective view and a top elevation view, respectively, of an example of an exemplary rotary drill bit 301 of the present invention including cutting elements 340 and 342 secured the bit body 321 of rotary drill bit 301. Cutting elements 340 and 342 may be manufactured according to the above-described processes of the present invention. Further, as shown in FIG. 12, cutting element 340 may comprise a polycrystalline diamond table 347 formed upon a substrate 346. Similarly, cutting element 342 may comprise a polycrystalline diamond table 345 formed upon a substrate 344. Generally, rotary drill bit 301 includes a bit body 321 which defines a leading end structure for drilling into a subterranean formation by rotation about longitudinal axis 311 and application of weight-on-bit, as known in the art. More particularly, rotary drill bit 301 may include radially and longitudinally extending blades 310 including leading faces 334. Further, circumferentially adjacent blades 310 define so-called junk slots 338 therebetween, as known in the art. As shown in FIGS. 11 and 12, rotary drill bit 301 may also include, optionally, cutting elements 308 (e.g., generally cylindrical cutting elements such as PDC cutters) which may be conventional, if desired. Additionally, rotary drill bit 301 includes nozzle cavities 318 for communicating drilling fluid from the interior of the rotary drill bit 301 to the cutting elements 308, face 339, and threaded pin connection 360 for connecting the rotary drill bit 301 to a drilling string, as known in the art.

It should be understood that although rotary drill bit 301 includes cutting element 340 and 342 the present invention is not limited by such an example. Rather, a rotary drill bit according to the present invention may include, without limitation, one or more cutting elements according to the present invention. Optionally, all of the cutting elements (i.e., 340, 342, and 308) shown in FIG. 11 may be formed according to a process contemplated by the present invention. Also, one of ordinary skill in the art will understand that FIGS. 11 and 12 merely depict one example of a rotary drill bit employing at least one cutting element of the present invention, without limitation. More generally, the present invention contemplates that drill bit 301 may represent any number of earth-boring tools or drilling tools, including, for example, core bits, roller-cone bits, fixed-cutter bits, eccentric bits, bicenter bits, reamers, reamer wings, or any other downhole tool including polycrystalline diamond cutting elements or inserts, without limitation.

While certain embodiments and details have been included herein and in the attached invention disclosure for purposes of illustrating the invention, it will be apparent to those skilled in the art that various changes in the methods and apparatus disclosed herein may be made without departing form the scope of the invention, which is defined in the appended claims. The words "including" and "having," as used herein, including the claims, shall have the same meaning as the word "comprising."

What is claimed is:

1. An article of manufacture comprising:
a volume of polycrystalline diamond bonded to a substrate and having a catalyst material dispersed substantially throughout the volume of polycrystalline diamond, a majority of the volume of polycrystalline diamond comprising diamond grains approximately 2 µm or larger, the volume of polycrystalline diamond further comprising at least some unconverted fullerenes, and wherein the volume of polycrystalline diamond is formed by a method comprising:
providing a mixture comprising:
at least about 80% by weight diamond; and fullerenes;
exposing the mixture to a pressure of at least about 60 kilobar; and
heating the mixture to a temperature of at least about 1350° Celsius.

2. The article of manufacture of claim 1, wherein the volume of polycrystalline diamond bonded to the substrate exhibits increased wear resistance due to the presence of fullerenes during manufacture of the volume of polycrystalline diamond.

3. The article of manufacture of claim 1, wherein the substrate comprises cobalt-cemented tungsten carbide and is substantially cylindrical.

4. The article of manufacture of claim 1, wherein the mixture includes less than about 0.003% by weight carbon in a non-fullerenes, non-diamond form.

5. The article of manufacture of claim 1, wherein the volume of polycrystalline diamond bonded to the substrate exhibits increased thermal stability due to the presence of fullerenes during manufacture of the volume of polycrystalline diamond.

6. The article of manufacture of claim 1, wherein the substrate comprises at least one of the following: titanium carbide, niobium carbide, tantalum carbide, vanadium carbide, iron, and nickel.

7. The article of manufacture of claim 1, wherein the substrate and the volume of polycrystalline diamond form a polycrystalline diamond compact.

8. The article of manufacture of claim 1, wherein the mixture comprises at least about 0.01% by weight fullerenes.

9. The article of manufacture of claim 8, wherein the mixture comprises at least about 0.01% by weight $C_{60}$ fullerenes.

10. The article of manufacture of claim 1, wherein the mixture comprises between about 0.01% by weight and about 0.3% by weight fullerenes.

11. The article of manufacture of claim 1, wherein the mixture comprises one or more of the following fullerenes: $C_{24}$ fullerenes, $C_{28}$ fullerenes, $C_{32}$ fullerenes, $C_{36}$ fullerenes, $C_{50}$ fullerenes, $C_{60}$ fullerenes, $C_{70}$ fullerenes, $C_{76}$ fullerenes, $C_{84}$ fullerenes, $C_{90}$ fullerenes, and $C_{94}$ fullerenes.

12. The article of manufacture of claim 1, wherein the mixture comprises fullerenes containing soot or nanotubes.

13. The article of manufacture of claim 1, wherein the mixture comprises:
diamond powder having a nominal size of about 20 microns;
at least 99% pure $C_{60}$ fullerenes.

14. A rotary drill bit for drilling a subterranean formation, comprising:
a bit body comprising a leading end having generally radially extending blades structured to facilitate drilling of a subterranean formation;
at least one cutting element comprising a substrate including a volume of polycrystalline diamond bonded to the substrate and having a catalyst material dispersed substantially throughout the volume of polycrystalline diamond, a majority of the volume of polycrystalline diamond comprising diamond grains approximately 2 µm or larger, the volume of polycrystalline diamond further comprising at least some unconverted fullerenes, and wherein the volume of polycrystalline diamond being formed by a method comprising:
providing a mixture comprising:
at least 80% by weight diamond; and
fullerenes;
exposing the mixture to a pressure of at least about 60 kilobar;
exposing the mixture to a temperature exceeding 1350° Celsius.

15. The rotary drill bit of claim 14, wherein the volume of polycrystalline diamond bonded to the substrate exhibits increased wear resistance due to the presence of fullerenes during manufacture of the polycrystalline diamond.

16. The rotary drill bit of claim 14, wherein the substrate comprises cobalt-cemented tungsten carbide and is substantially cylindrical.

17. The rotary drill bit of claim 14, wherein the substrate comprises at least one of the following: titanium carbide, niobium carbide, tantalum carbide, vanadium carbide, iron, and nickel.

18. The rotary drill bit of claim 14, wherein the mixture includes less than about 0.003% by weight carbon in a non-fullerenes, non-diamond form.

19. The rotary drill bit of claim 14, wherein the mixture comprises at least about 0.01% by weight fullerenes.

20. The rotary drill bit of claim 14, wherein the mixture comprises between about 0.01% by weight and about 0.3% by weight fullerenes.

21. The rotary drill bit of claim 14, wherein the mixture comprises at least one of the following fullerenes: $C_{24}$ fullerenes, $C_{28}$ fullerenes, $C_{32}$ fullerenes, $C_{36}$ fullerenes, $C_{50}$ fullerenes, $C_{60}$ fullerenes, $C_{70}$ fullerenes, $C_{76}$ fullerenes, $C_{84}$ fullerenes, $C_{90}$ fullerenes, and $C_{94}$ fullerenes.

22. The rotary drill bit of claim 14, wherein the mixture comprises fullerenes containing soot or nanotubes.

23. A polycrystalline diamond compact comprising:
a volume of polycrystalline diamond bonded to a substrate; and
a catalyst material dispersed substantially throughout the volume of polycrystalline diamond;
wherein a majority of the volume polycrystalline diamond comprises diamond grains approximately 2 µm or larger, the volume of polycrystalline diamond further comprising at least some unconverted fullerenes, and wherein the volume of polycrystalline diamond includes less than about 1% by weight carbon in a non-fullerenes, non-diamond form.

24. The polycrystalline diamond compact of claim 23, wherein the substrate comprises at least one of the following: tungsten carbide, titanium carbide, niobium carbide, tantalum carbide, vanadium carbide, iron, cobalt, and nickel.

25. The polycrystalline diamond compact of claim 23, wherein the volume of polycrystalline diamond bonded to the substrate exhibits increased wear resistance or thermal stability due to the presence of fullerenes during manufacture of the volume of polycrystalline diamond.

26. A polycrystalline diamond compact comprising:
a volume of polycrystalline diamond bonded to a substrate; and
a catalyst material dispersed substantially throughout the volume of polycrystalline diamond;
wherein a majority of the volume of polycrystalline diamond comprises diamond grains approximately 2 µm or larger, the volume of polycrystalline diamond further comprising at least some unconverted fullerenes, and wherein the volume of polycrystalline diamond is substantially free of non-fullerenes, non-diamond carbon.

27. The polycrystalline diamond compact of claim 26, wherein the substrate comprises at least one of the following: tungsten carbide, titanium carbide, niobium carbide, tantalum carbide, vanadium carbide, iron, cobalt, and nickel.

28. The polycrystalline diamond compact of claim 26, wherein the volume of polycrystalline diamond bonded to the substrate exhibits increased wear resistance or thermal stability due to the presence of fullerenes during manufacture of the volume of polycrystalline diamond.

29. A polycrystalline diamond compact comprising:
a volume of polycrystalline diamond bonded to a substrate; and
a catalyst material dispersed substantially throughout the volume of polycrystalline diamond;
wherein a majority of the volume of polycrystalline diamond comprises diamond grains approximately 2 µm or larger, the volume of polycrystalline diamond further comprising at least some unconverted fullerenes, and wherein the volume polycrystalline diamond exhibits a diamond volume fraction exceeding about 90%.

30. The polycrystalline diamond compact of claim 29, wherein the substrate comprises at least one of the following: tungsten carbide, titanium carbide, niobium carbide, tantalum carbide, vanadium carbide, iron, cobalt, and nickel.

31. The polycrystalline diamond compact of claim 29, wherein the volume of polycrystalline diamond bonded to the substrate exhibits increased wear resistance or thermal stability.

32. The polycrystalline diamond compact of claim 29, wherein the volume of polycrystalline diamond exhibits a diamond volume fraction exceeding about 90.5%.

33. The polycrystalline diamond compact of claim 29, wherein the volume of polycrystalline diamond exhibits a diamond volume fraction exceeding about 90.6%.

34. The polycrystalline diamond compact of claim 29, wherein the volume of polycrystalline diamond exhibits a diamond volume fraction exceeding about 90.7%.

35. A polycrystalline diamond compact comprising:
a volume of polycrystalline diamond bonded to a substrate; and
a catalyst material dispersed substantially throughout the volume of polycrystalline diamond;
wherein a majority of the volume of polycrystalline diamond comprises diamond grains approximately 2 µm or larger, and wherein the volume of polycrystalline diamond comprises at least some unconverted fullerenes.

* * * * *